May 3, 1932. W. A. SERIGHT 1,857,006
VINE CUTTER
Filed Feb. 27, 1931 4 Sheets-Sheet 2

W. A. Seright, INVENTOR
BY
ATTORNEY

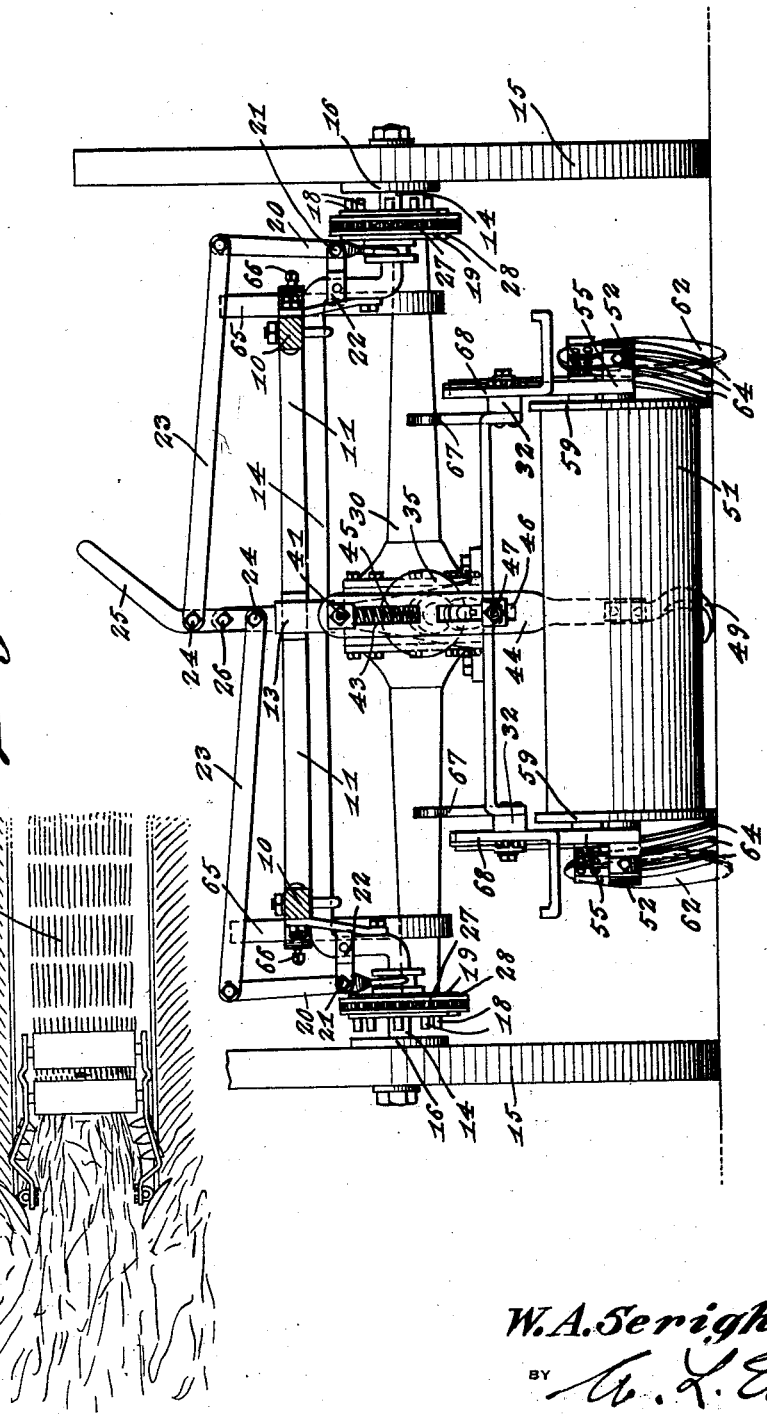

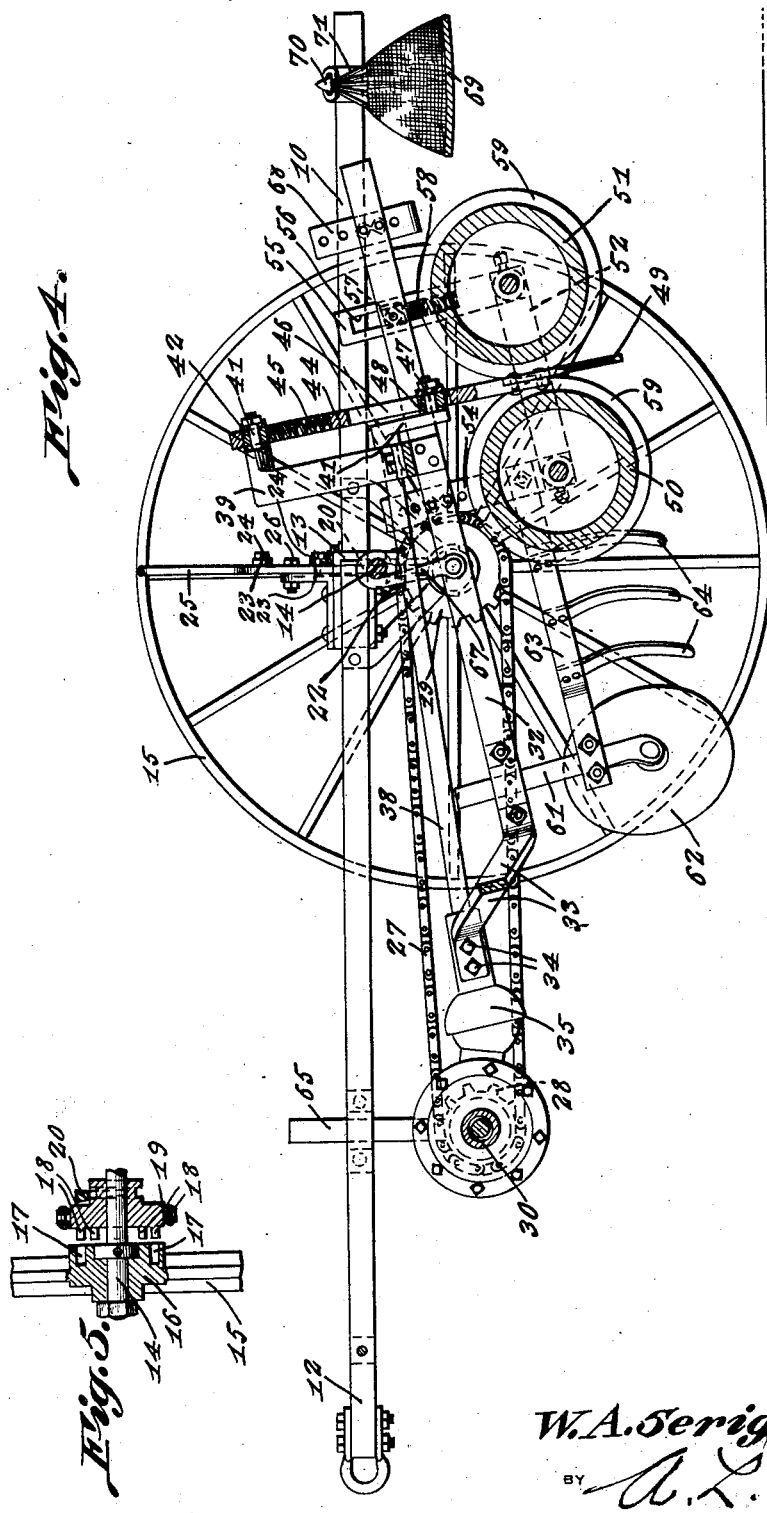

Patented May 3, 1932

1,857,006

UNITED STATES PATENT OFFICE

WARREN A. SERIGHT, OF FRUITLAND, IOWA

VINE CUTTER

Application filed February 27, 1931. Serial No. 518,856.

This invention relates to improvements in vine cutting machines, especially adapted for cutting sweet potato vines, and has for an object the provision of a machine which will cut the vines longitudinally along opposite edges of a row and direct the cut vines inward into the path of a transverse cutting member, means being provided for holding the vines during the transverse cutting operation.

Another object of the invention is the provision of a machine which includes a main wheel supported frame and a cutting frame, the latter carrying mechanism for cutting the vines and arranging and holding them in position for cutting, together with flexible means for operating the cutting mechanism from power derived from the supporting wheels, so that the cutting mechanism may be raised to an inactive position, or lowered into an active position without disconnecting said cutting mechanism from its power.

Another object of the invention is the provision of a machine which in addition to the above and other advantageous features, is simple in construction, reliable and efficient in use, and may be adjusted to suit various conditions.

With the above and other objects in view, the invention further includes the following novel features and details of construction, to be hereinafter more fully described, illustrated in the accompanying drawings and pointed out in the appended claims.

In the drawings:—

Figure 3 is a sectional view on the line 3—3 of Figure 1.

Figure 4 is a vertical lonigtudinal sectional view.

Figure 5 is a fragmentary section illustrating one of the clutches.

Figure 6 is a diagrammatic view illustrating the cutting operation.

Figure 1:
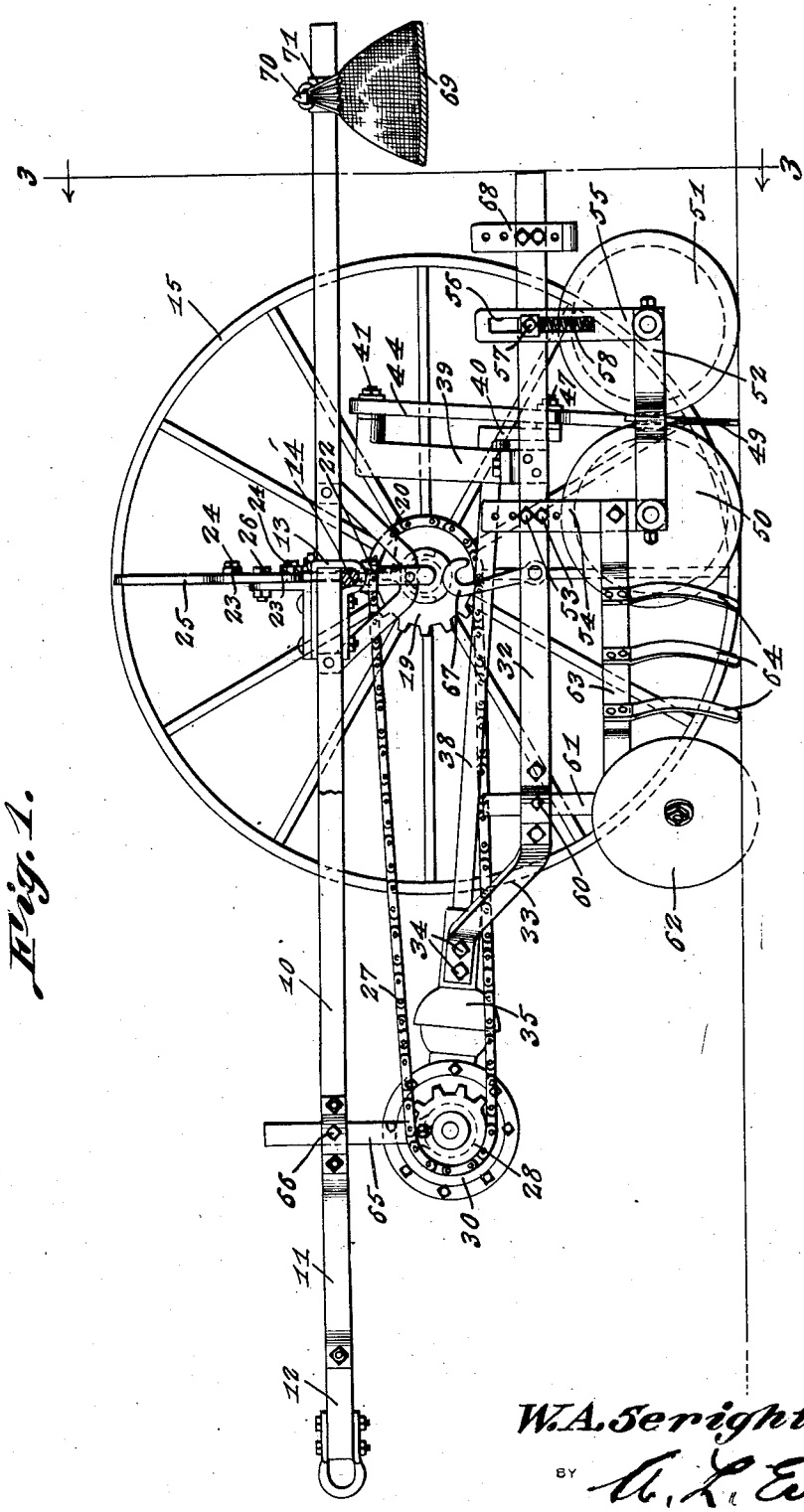
Figure 1 is a side elevation of a vine cutting machine constructed in accordance with the invention, a portion of one of the side members of the main wheel supported frame being broken away and the hammock seat shown in section.
Figure 2:
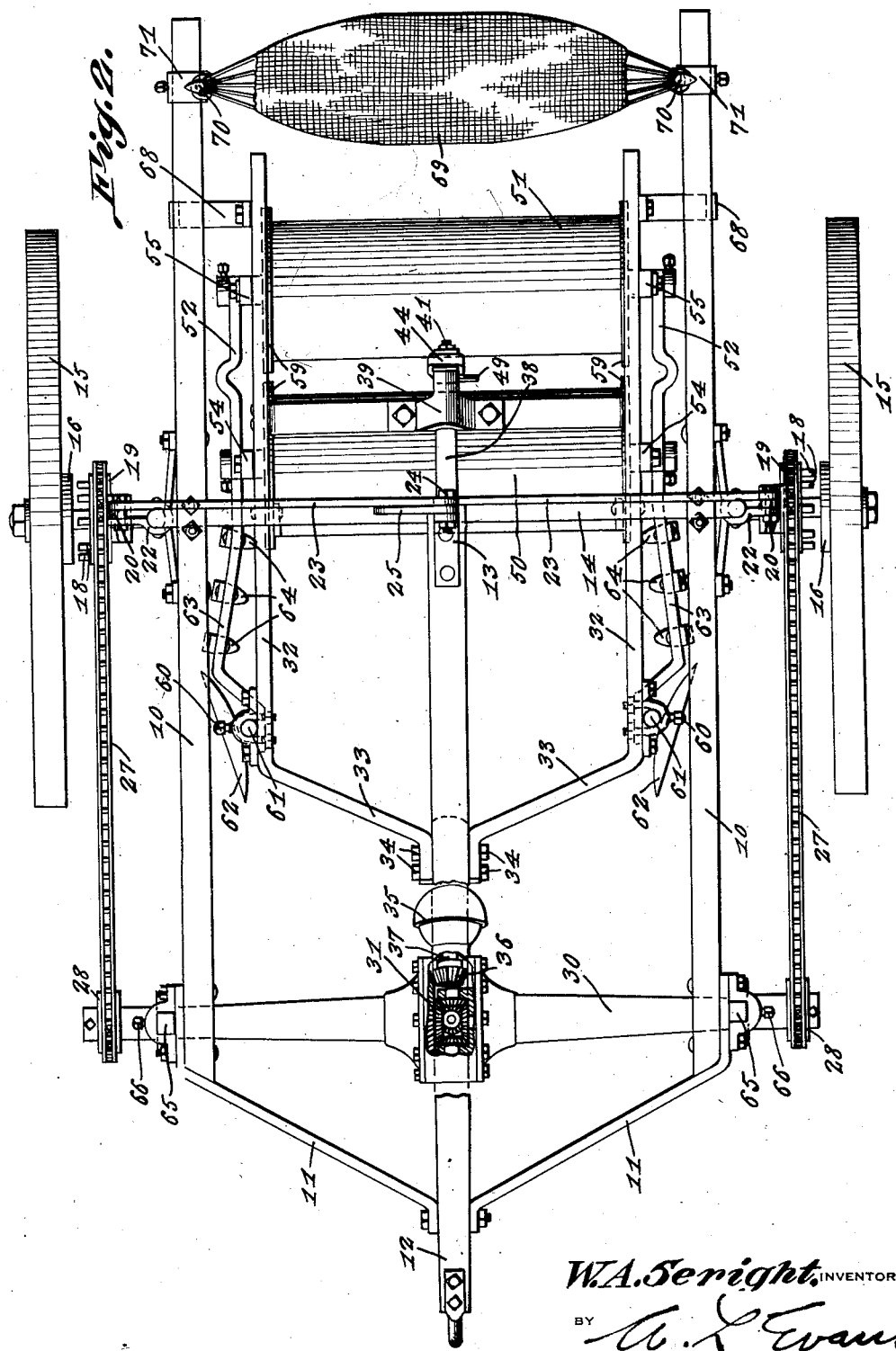
Figure 2 is a top plan view.

Referring to the drawings in detail wherein like characters of reference denote corresponding parts, the invention as shown comprises a main wheel supported frame which includes parallel side bars 10. These bars are connected at their forward ends by means of inclined rods 11, the latter serving as a connection with a draft tongue 12, which extends rearward and is connected by means of a clamp 13 with a yoke or axle 14, upon the outer ends of which are mounted freely rotatable wheels 15.

The hubs 16 of the wheels 15 are provided with sockets 17 and these sockets are adapted to receive pins 18 which extend from sprockets 19, the latter being movable axially of the extended ends of the axle 14 so as to lock the wheels upon the axle. A clutch is thus provided which may be controlled by a shifting lever 20, each of these levers being pivotally secured as shown at 21, to a bracket 22 which is clamped upon opposite sides of the axle 14. Pivotally connected to the upper ends of the levers 20 are connecting rods 23 and the opposite ends of these rods are pivotally secured as at 24 to a lever 25. This lever is mounted for pivotal movement as shown at 26 at a point between the pivotal connections 24, so that by rocking the lever 25 in one direction, the clutches may be disengaged so that the wheels 15 will be free of the sprockets 19, while movement of the lever 25 in an opposite direction will serve to lock the wheels and sprockets together.

The sprockets 19 operate chains 27 and these chains operate sprocket wheels 28 which are mounted upon the outer end of the axle sections arranged within an axle housing 30 carried by the main frame. These axle sections are connected by a differential mechanism 31 so as to compensate for the difference in speed of rotation of the wheels when making a turn.

In addition to the main frame, the invention includes a cutting frame. This latter frame includes parallel side members 32, from which extend forwardly and inwardly inclined portions 33, the latter being secured as at 34 to one member of a universal coupling 35. The other member of this coupling is connected with the differential 31 through the medium of a gear 36 and a shaft section 37 so as to drive a relatively long shaft section 38 which extends rearwardly. The shaft section 38 extends through a substantially vertically disposed bearing bracket 39 and carries a crank arm 40. The upper end of the bracket 39 has extending therefrom a stud 41 upon which is mounted an anti-friction roller 42 and the latter operates within a slot 43 provided in a substantially vertically disposed knife arm or carrier 44. A spring 45 which is arranged within the slot 43 serves to yieldingly hold the stud and roller 41 and 42 in the upper end of the slot 43. The knife arm 44 is provided with an additional slot 46 within which extends a stud 47 which is carried by the crank arm 40 and an anti-friction roller 48 which is mounted upon this stud. The lower end of the arm 44 carries a knife 49.

The knife 49 extends downwardly between spaced rollers 50 and 51. These rollers are mounted at the opposite ends of bars 52 whose forward ends are adjustably connected as at 53 to the side bars 32 by means of hangers 54. Hangers 55 serve to support the rear end of the bars 52 and these hangers are slotted as shown at 56 to receive guide blocks 57 which are carried by the bars 32 of the cutting frame. Springs 58 which are mounted in the slots 56 serve to yieldingly force the rear ends of the bars 52 downward and consequently hold the roller 51 in yielding contact with the ground. These rollers 50 and 51 are provided with marginal flanges 59 so that the rollers may pass over the vines without unduly mashing the latter.

Adjustably mounted at the forward ends of the bars 33 upon opposite sides of the machine as indicated at 60 are standards 61. These standards carry at their lower ends disks or like cutting elements 62. Inclined bars 63 connect the standards 61 with the hangers 54 and serve to brace the disks 62. In addition, these bars 63 carry rake teeth 64.

The axle housing 30 has its opposite ends adjustably secured to the side bars 10 of the main frame and for this purpose, the axle housing has extending upwardly therefrom, arms 65. These arms are slidable and are adjustably secured in bearing brackets 66 caried by the side bars 10 of the frame, so that the forward end of the cutting frame may be adjusted to ridges of any height. In addition, by connecting the cutting frame to the main frame solely through the medium of the universal joint 35, the said cutting frame may be adjusted laterally, or it may be raised and held in raised poistion without having to disconnect the driving mechanism from the cutting mechanism. In order to hold the cutting frame and its mechanism in raised position as shown in Figure 4 of the drawings, the cutting frame carries hooks 67 for detachable engagement with the axle 14.

The cutting frame has adjustably mounted thereon foot straps 68 while a hammock seat 69 has its opposite ends detachably mounted upon hooks 70 which are carried by adjustably mounted sleeves 71 which are movable longitudinally of the side bars 10 of the main wheel supported frame.

With the clutches engaged, forward movement of the machine will cause the cutting disks to cut the vines longitudinally upon opposite sides of the row and will in addition, cut a furrow in the ground. The disks extend laterally beyond the ends of the rollers 50 and 51, while the bars 63 which carry the rake fingers 64 incline inwardly and rearwardly, so that the foremost of these fingers will pick up the outermost vines and direct them inward, while the rearmost fingers will place the vines within the ends of the rollers. The vines will thus be arranged longitudinally of the row in the path of the rollers. Operation of the shaft 38 will impart reciprocatory swinging movement to the knife arm 44, movement of the arm from right to left in Figure 3 of the drawings, causing the knife to pick up the vines and to pass transversely therethrough, the vines being permitted only limited movement due to their engagement by the rollers 50 and 51. After the knife has reached the limit of its cutting stroke, the crank arm 40 will be positioned in the upper end of the slot 46, continued movement of the crank arm raising the knife arm so that the knife will be elevated above the vines during its reverse or idle movement. When the knife reaches the limit of this movement it will again be lowered into vine engaging position. The vines will be cut into lengths and deposited in sections S as indicated in Figure 6 of the drawings.

The invention is susceptible of various changes in its form, proportions and minor details of construction and the right is herein reserved to make such changes as properly fall within the scope of the appended claims.

Having described the invention what is claimed is :—

1. In a vine cutting machine, a main frame, wheels supporting the frame, a cutting frame, vine cutting mechanism carried by the cutting frame and including a vertically disposed reciprocatory knife and means acting upon each side of the knife to hold the vines in position for cutting, operating mechanism carried by the main frame, and a universal drive connection between the main and cutting frames to operatively connect the frames and provide a driving connection between the operating mechanism and the cutting mechanism.

2. In a vine cutting machine, a main frame, wheels supporting the same, a cutting frame, vine cutting mechanism carried by the cutting frame, said mechanism including a vertically disposed reciprocatory knife movable transversely of the row of vines, means to raise said knife during movement in one direction, and means to hold the vines in position for cutting, operating mechanism carried by the main frame, and a universal drive connection between the operating mechanism and the cutting mechanism.

3. In a vine cutting machine, a main frame, wheels supporting the main frame, a cutting frame, vine cutting mechanism carried by the cutting frame, said mechanism including spaced rotatably mounted vine holding rollers, a knife mounted for movement between and longitudinally of said rollers, means to move the knife, and means arranged in advance of the rollers upon opposite sides of the cutting frame to direct the vines relatively inward.

4. In a vine cutting machine, a main frame, wheels supporting the main frame, a cutting frame, vine cutting mechanism carried by the cutting frame, said mechanism including spaced rotatably mounted vine holding rollers, a knife mounted for movement between and longitudinally of said rollers, means to move the knife, means carried by the cutting frame in advance of and beyond the ends of the rollers to cut the vines longitudinally of the rows, and means to direct the cut vines inward.

5. In a vine cutting machine, a main frame, wheels supporting the main frame, a cutting frame, vine cutting mechanism carried by the cutting frame, said mechanism including spaced rotatably mounted vine holding rollers, a knife mounted for movement between and longitudinally of said rollers, means to move the knife, means carried by the cutting frame in advance of and beyond the ends of the rollers to cut the vines longitudinally of the rows, and inclined rakes located between the longitudinal cutting means and rollers to direct the vines inward into the path of the knife.

In testimony whereof I affix my signature.

WARREN A. SERIGHT.